United States Patent

Marzocchi

[15] 3,650,810
[45] Mar. 21, 1972

[54] GLASS FIBERS IMPREGNATED WITH POLYMERS CONTAINING AN UNSATURATED SILANE

[72] Inventor: Alfred Marzocchi, Cumberland, R.I.
[73] Assignee: Owens-Corning Fiberglas Corporation
[22] Filed: Nov. 20, 1969
[21] Appl. No.: 878,500

[52] U.S. Cl. ..................................117/76, 117/72, 117/77, 117/126 GS, 117/126 GR, 117/161 A, 117/126 ZA, 117/163, 260/29.2 M, 260/29.3, 260/38, 260/41, 260/41.5, 260/845, 260/846
[51] Int. Cl. .....................................C03c 17/30, C03c 17/32
[58] Field of Search ..................260/29.3, 38, 845, 846, 890, 260/894, 41.5; 117/72, 77, 126, 163

[56] References Cited

UNITED STATES PATENTS 3,424,608 1/1969 Marzocchi et al. ...............260/29.3
3,533,830 10/1970 Marzocchi et al. ...............260/29.3

*Primary Examiner*—Donald J. Arnold
*Attorney*—Staelin & Overman and Herman I. Hersh

[57] ABSTRACT

The improvement in the bonding relationship between glass fibers and elastomeric materials in the manufacture of glass fibers, glass reinforced elastomeric products wherein the individual glass fibers are sized, or a bundle of fibers are impregnated with a composition containing a polymeric material formed by the reaction of an organic silane having ethylenic unsaturation with either a copolymer of styrene and butadiene or poly-alpha-olefins.

10 Claims, 4 Drawing Figures

Patented March 21, 1972  3,650,810

INVENTOR
Alfred Marzocchi
By Staelin & Overman
Att'ys

GLASS FIBERS IMPREGNATED WITH POLYMERS CONTAINING AN UNSATURATED SILANE

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and nonwoven fabrics which are formed of such glass fiber stands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and nonwoven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from three to 20 carbon atoms, such as propylene, and a polyene, such as dicyclopentadiene, one to four hexadiene and preferably an alkylene or alkylidene norbornene, such as 5-alkylidene-2-norbornene and the like in which the alkylidene group numbers from two to 12 carbon atoms.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved composition which may be used a a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which.

Figure 1:
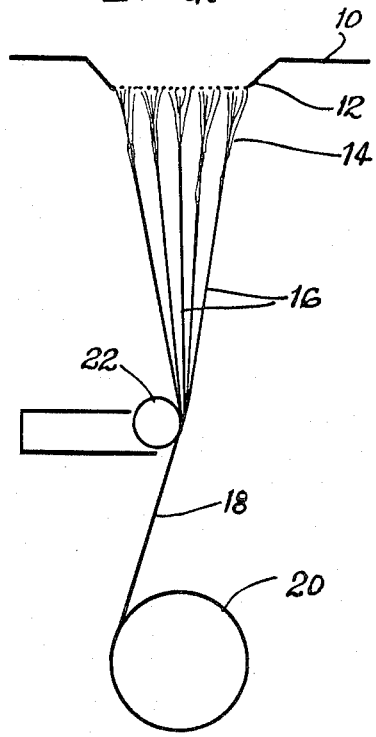
FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined the manufacture of glass fiber - elastomeric products.

The following examples will serve to illustrate the principal concepts of this invention in a composition and method for the treatment, as by impregnation, of bundles, yarns, cords and fabrics of glass fibers wherein the fibers have previously been sized in forming with a conventional size composition which has preferably been modified to embody a glass fiber anchoring agent.

EXAMPLE 1

Forming Size Composition
8.0% by weight partially dextrinized starch
1.8% by weight hydrogenated vegetable oil
0.4% by weight cationic wetting agent (lauryl amine acetate)
0.2% by weight nonionic emulsifying agent
1.0% by weight gamma-aminopropyltriethoxy silane
88.6% by weight water

EXAMPLE 2

Forming Size Composition
3.2% by weight saturated polyester resin
0.1% by weight fatty acid amine wetting agent (Nopcogen 16 L)
0.1% by weight polyvinyl alcohol
3.0% by weight pyrrolidine
0.3% by weight gamma-aminopropyltriethoxy silane
0.1% by weight glacial acetic acid
93.2% by weight water

EXAMPLE 3

Forming Size Composition
0.2% by weight paraffin wax in aqueous emulsion
1.3% by weight cationic amide polyester resin
2.3% by weight polyglycol condensate (300 to 400 m w)
0.25% by weight gelatin
0.5% by weight gamma-aminopropyltriethoxy silane
0.1% by weight dibasic ammonium phosphate
0.2% by weight glacial acetic acid
95.15% by weight water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorten lengths, and which can be formed into woven or nonwoven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples:

EXAMPLE 4

Preparation of Terpolymer

A terpolymer of butadiene, styrene and an organo silane containing ethylenic unsaturation is prepared in accordance with the following:

A reaction mixture is formulated as follows:

| 72 parts | Butadiene |
| 28 parts | Styrene |
| 180 parts | Water |
| 4.5 parts | Soap |
| 0.3–0.5 parts | Dodecyl mercaptan |
| 0.3 parts | potassium sulfide |
| 5 parts | gamma-methacryloxypropyl trimethoxy silane. |

A free radical catalyst (benzoyl peroxide) is added and the mixture is heated to about 122° F. for about 11 hours, and the resulting terpolymer is separated from the reaction mixture and found to contain about 4.4 percent by weight gamma-methacryloxypropyl trimethoxy silane.

EXAMPLE 5

| Impregnating Composition | Parts by Weight |
|---|---|
| Gamma-methacryloxypropyl trimethoxy silane-butadiene-styrene terpolymer | 25.0 |
| Water | 75.0 |

Figure 2:
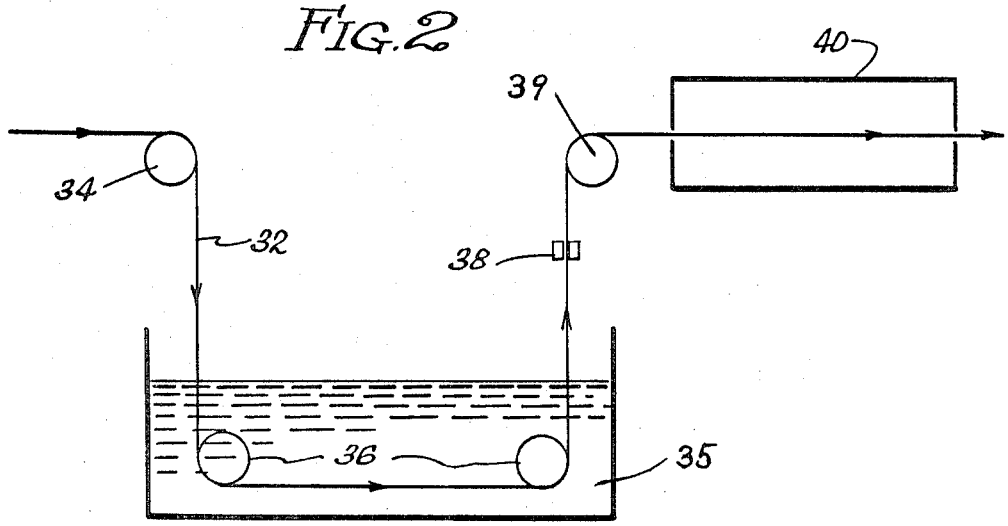
FIG. 2 is a flow diagram illustrating the treatment of glass fibers subsequent to their being formed into bundles, strands, yarns, cords or fabrics to impregnate the glass fiber bundles in accordance with the preferred practice of this invention.

Impregnation with the aqueous composition of Example 4 can be made by conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperature of drying.

The gamma-methacryloxypropyl trimethoxy silane-butadiene-styrene terpolymer is terpolymer formed by the reaction of an unsaturated silane, having ethylenic unsaturation in an organic group attached to the silicon atom, with butadiene and styrene in the presence of a free radical catalyst such as an organic peroxide catalyst as illustrated by Example 4. Conventional emulsifiers and catalysts may be employed. The unsaturated silane is employed in an amount such that that resulting terpolymer contains 0.1 to 10 percent by weight of the organo-silicon compound, in the form of the silane, its hydrolysis product or its polymerization product.

It will be understood that a wide variety of other unsaturated silanes may be used instead of methacryloxypropyl trimethoxy silane, such as vinyl triethoxy silane, vinyl trichloro silane, allyl trichloro silane, methallyl trimethoxy silane, and many others. In general, the silanes useful in producing the terpolymers in the present invention have the formula:

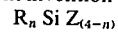

wherein $n$ is an integer from 1 to 3, Z is a highly hydrolyzable group such as halogen (chlorine, fluorine, bromine, or iodine); an alkoxy group having one to 12 carbon atoms such as methoxy, ethoxy, etc.; and R is hydrogen or an alkyl group in which at least one of the R groups is an alkenyl group, such as vinyl, allyl, etc.; cycloalkenyl such as cyclohexenyl; arakenyl, such as phenyl propenyl, phenyl ethenyl, etc.; cycloalkylalkenyl such as cyclohexyl ethenyl; alkyl cyclokenyl such as methyl- and ethyl-cyclohexenyl, and alkenyl carbonyloxyalkyl such as beta-acryloxyethyl.

The amount of the terpolymer in the impregnating or sizing compositions is not critical, and can generally be varied in the range of 15 to 50 parts by weight, the remainder of the composition being water and a surface-active agent such as a quaternary ammonium hydroxide (e.g., tetra alkyl ammonium hydroxides or tetra alkanolyl ammonium hydroxides) in order to enhance the stability of the composition. It is generally preferred to have a minimum solids content of 10 percent and a maximum solids content of about 50 percent by weight. Introduction should be made in an amount to impregnate with dry solids 5 to 25 percent by weight of the glass fibers treated, and preferably 10 to 15 percent by weight. Another composition illustrating this concept of the invention can be formulated as follows:

EXAMPLE 6

|  | Parts by Weight |
| --- | --- |
| Vinyl trimethoxy silane-butadiene-styrene terpolymer (35% solids) | 40.0 |
| Tetra ethanol ammonium hydroxide | 5.0 |
| Water | 40.0 |

Application of this composition is made in an amount to deposit dry solids of 5 to 25 percent by weight of the sized fibers.

In accordance with a further concept of the present invention, the impregnating composition can be formulated as follows:

EXAMPLE 7

|  | Parts by Weight |
| --- | --- |
| Natural rubber latex-resorcinal formaldehyde resin dispersed in aqueous medium with a solids content of 38% by weight (Lotol 5440) | 2-10 |
| Gamma methacryloxypropyl trimethoxy silane-butadiene-styrene terpolymer (40% solids) | 15-50 |

Water is incorporated in the foregoing composition in amounts to produce an impregnating composition having a minimum solids content of 10 percent and a maximum solids content of about 50 percent by weight. Introduction should be made in an amount to impregnate with dry solids 5 to 25 percent by weight of the glass fiber system.

Suitable resorcinol formaldehyde resins and combination thereof with natural rubber latex are marketed by the U.S. Rubber Company under the trade name "Lotol 5440." For the preparation of same, reference can be made to Canadian Pat. No. 435,754, in which description is made of the reaction of resorcinol and formaldehyde in the presence of a substantial amount of a short chained alkyl amine for purposes of stabilizing the reaction and products formed therefrom, as well as a description of the combination of the formed resin with rubber latex.

In accordance with a further concept of the present invention, an impregnating composition can be formulated as follows:

EXAMPLE 8

|  | Parts by Weight |
| --- | --- |
| Vinyl trichloro silane-polyethylene copolymer | 25.0 |
| Tetramethyl ammonium hydroxide | 2.0 |
| Water | 75.0 |

Impregnation with this composition can be performed in the same manner described above with reference to Example 4.

The vinyl trichloro silane-polyethylene copolymer is a graft copolymer formed by the reaction of vinyl trichloro silane with a low molecular weight polyethylene, is more fully described in U.S. Pat. No. 3,075,948. It will be understood that graft copolymers useful in accordance with this concept of the present invention are those formed by the reaction of a silane containing ethylenic unsaturation having the general formula:

wherein $n$ R and Z are as previously described, and wherein low molecular weight polymers of alpha-monoolefins having two to six carbon atoms are described in the aforementioned patent. It is generally preferred that the olefin be ethylene, and that the molecular weight of the olefin polymer be less than 10,000.

It is preferred to formulate the impregnating composition with 15 to 50 parts by weight copolymer, with the remainder being water such that the solids content is generally within the range of 10 to 50 percent by weight.

In accordance with a further concept of the invention, the copolymer can be formulated with a resorcinol formaldehyde-latex to provide a glass fiber treating composition, as represented by the following example:

EXAMPLE 9

|  | Parts by Weight |
| --- | --- |
| Natural rubber latex-resorcinol formaldehyde resin(38% solids) (Lotol 5440) | 2-10 |
| Vinyl trimethoxy silane-polyethylene copolymer(65% solids) | 15-50 |

The foregoing composition is dispersed in water to produce an impregnating composition having a minimum solids content of 10 percent and the maximum solids content of about 50 percent by weight. The dispersion should be applied so as to impregnate with dry solids 5 to 25 percent by weight of the glass fiber system.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomeric material in the continuous phase can be achieved when the impregnating compositions of Examples 5 to 9 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-amino-propyltriethoxy silane. Instead of gamma-aminopropyltriethoxy silane, in the size or in the impregnating composition, use can be made of other organo silicon compounds in which the organic group attached to the silicon atom contains an amino group, such as gamma-aminovinyl-diethoxy silane, gamma(triethoxysilylpropyl-amide) propylamine, N(gamma-triethoxysilylpropyl) propylamine, beta-aminoallyltriethoxy silane, and para-aminophenyl-triethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyl-trimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylate chromic chloride.

A forming size composition embodying the further concepts of the present invention can be formulated as follows:

EXAMPLE 10

| | Parts by Weight |
|---|---|
| Unsaturated silane-butadiene-styrene terpolymer | 15–50 |
| Anchoring agent | 0.1–3.0 |

To the foregoing, water is added to form an aqueous dispersion having a solids content within the range of 2–10 percent by weight. Application should be made in an amount to deposit dry solids of 1–4 percent by weight of the sized glass fibers.

EXAMPLE 11

| | Parts by Weight |
|---|---|
| Methallyl triethoxy silane terpolymer | 10.0 |
| Gamma-aminopropyltriethoxy silane | 0.2 |
| Water | 100.0 |

EXAMPLE 12

| | Parts by Weight |
|---|---|
| Natural rubber latex-resorcinol formaldehyde resin(38% solids) (Lotol 5440) | 2.0 |
| Vinyl silane butadiene-styrene terpolymer | 2.0 |
| Gamma-aminopropyltriethoxy silane | 0.1 |
| Water | 100.0 |

In accordance with a further concept of the present invention a forming size composition can be formulated as follows:

EXAMPLE 13

| | Parts by Weight |
|---|---|
| Unsaturated silane-polyolefin copolymer | 15–50 |
| Anchoring agent | 0.1–3.0 |

Water is added to this composition to form an aqueous dispersion with a solids content in the range of 2–15 percent by weight. The resulting dispersion may be applied in an amount to deposit dry solids to 1–5 percent by weight of the glass fibers.

EXAMPLE 14

| | Parts by Weight |
|---|---|
| Vinyl trichloro silane-polyethylene copolymer | 5.0 |
| Gamma-aminopropyltriethoxy silane | 0.2 |
| Water | 100.0 |

EXAMPLE 15

| | Parts by Weight |
|---|---|
| Allyl triethoxy silane-polyethylene copolymer | 3.5 |
| Natural rubber latex-resorcinol formaldehyde resin(38% solids) (Lotol 5440) | 2.0 |
| Gamma-aminopropyltriethoxy silane | 0.1 |
| Water | 95.0 |

Figure 3:
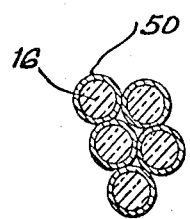
FIG. 3 is a cross-sectional view of glass fibers processed in accordance with the diagram illustrated in FIG. 1.
Figure 4:
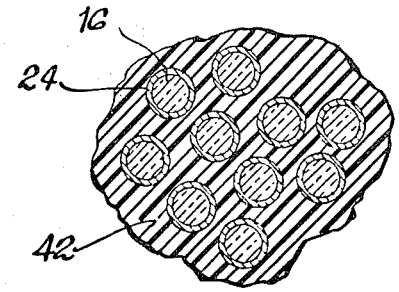
FIG. 4 is a cross-sectional view of a bundle of glass fibers processed in accordance with the flow diagram of FIG. 2.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat an compression or by vulcanization for advancement of the elastomeric material to a cured or vulcanized state while in combination with the treated glass fibers whereby the glass fibers or bundles of glass fibers become strongly integrated with the elastomeric material in the glass fiber-elastomeric product.

It will be understood that the size compositions, represented by Examples 10 to 15, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers. It will be understood further, that the glass fiber may be impregnated in forming with a size composition represented by Examples 10 to 15, followed by impregnation of strands, yarns, cords, fabrics or bundles formed thereof with compositions of this invention represented by Examples 5 to 8.

It will be apparent that I have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

I claim:

1. Glass fibers in which the individual glass fibers are coated or bundles of glass fibers are impregnated with a polymeric material selected from the group consisting of a terpolymer of butadiene, styrene and an organo silicon compound formed of an unsaturated silane having the formula $R_n Si Z_{(4-n)}$ wherein $n$ is an integer from 1 to 3, Z is a highly hydrolyzable group selected from the group consisting of halogen and alkoxy, and R is hydrogen or an organic group in which at least one of the R groups is selected from the group consisting of alkenyl, cycloalkenyl, aralkenyl, alkyl cycloalkenyl and alkenyl carbonyoxyalkyl and a graft copolymer of the unsaturated silane and a poly-alpha-olefin.

2. Glass fibers as defined in claim 1 wherein the polymeric material is in the form of an impregnant in bundles of glass fibers, and the impregnant also contains two to 10 parts by weight of a blend of a resorcinol formaldehyde resin and a natural rubber latex per 15–50 parts by weight of the polymeric material.

3. Glass fibers as defined in claim 2 wherein the bundle is formed of a plurality of glass fibers plied and twisted together.

4. Glass fibers as defined in claim 1 wherein the polymeric material is present in an amount within the range of 5 to 25 by weight of said fibers.

5. Glass fibers as defined in claim 1 wherein said silane is gamma-methacryloxypropyl trimethoxy silane.

6. Glass fibers as defined in claim 1 wherein said poly-alpha-olefin is polyethylene and said silane is vinyl trichloro silane.

7. An elastomeric product comprising an elastomer as the continuous phase and glass fibers distributed within the continuous phase of the elastomer in the form of individual glass fibers of bundles of glass fibers, and a coating on said glass fibers in the form of a coating on the individual fibers or an impregnant in the fiber bundle to enhance the bonding relationship between the elastomer and the glass fibers, said coating comprising a polymeric material selected from a group consisting of a terpolymer of butadiene, styrene and an organo silicon compound formed of an unsaturated silane having the formula $R_n Si Z_{(4-n)}$ wherein $n$ is an integer from 1 to 3, Z is a highly hydrolyzable group selected from the group consisting of halogen and alkoxy, and R is hydrogen or an organic group in which at least one of the R groups is selected from the group consisting of alkenyl, cycloalkenyl, aralkenyl, alkyl cycloalkenyl and alkenyl carbonyloxyalkyl and a graft copolymer of the unsaturated silane and a poly-alpha-olefin.

8. A product as defined in claim 7 wherein said coating also contains two to 10 parts by weight of blend of a resorcinol formaldehyde resin and a natural rubber latex 15–50 parts by weight of the polymeric mater.

9. A product as defined in claim 7 wherein said polymer is a copolymer of butadiene and styrene and said silane is gamma-methacryloxypropyl trimethoxy silane.

10. A product as defined in claim 7 wherein said polymer is polyethylene and said silane is vinyl trichloro silane.

* * * * *